United States Patent [19]
Yamazaki

[11] 3,812,970
[45] May 28, 1974

[54] SEPARATING APPARATUS

[76] Inventor: Masahiko Yamazaki, 2164-19, Fujitsukaya, Shinohara-cho, Kohoku-ku, Yokohama, Japan

[22] Filed: Nov. 2, 1972

[21] Appl. No.: 303,111

[30] Foreign Application Priority Data
Dec. 28, 1971   Japan.................................. 46-2991

[52] U.S. Cl.................. 210/316, 210/519, 210/521, 210/532
[51] Int. Cl............................................. B01d 23/00
[58] Field of Search .......... 210/300, 301, 305, 307, 210/316, 320, 521, 286, 283, 284, 519

[56] References Cited
UNITED STATES PATENTS
| 506,666 | 10/1893 | Burch | 210/300 |
|---|---|---|---|
| 663,765 | 12/1900 | Küchmann | 210/284 |
| 738,630 | 9/1903 | Rummel | 210/286 X |
| 745,870 | 12/1930 | Lowe | 210/305 |
| 1,976,273 | 7/1932 | White | 210/307 X |

FOREIGN PATENTS OR APPLICATIONS
17,712   12/1887   Great Britain...................... 210/521

Primary Examiner—Samih N. Zaharna
Assistant Examiner—Robert G. Mukai
Attorney, Agent, or Firm—George B. Oujevolk

[57]            ABSTRACT

A settler type separating apparatus comprises a tank for holding liquid having inlet and outlet ports; a plurality of horizontally disposed particle-receiving trays superposed parallel on each other at prescribed intervals, each having a plurality of cavities formed on the upper side; and a screen stretched over the upper open side of the cavities of the tray, wherein impure particles trapped in said cavities are obstructed from escaping by a boundary layer formed by the screen.

5 Claims, 5 Drawing Figures

PATENTED MAY 28 1974  3,812,970

SEPARATING APPARATUS

BACKGROUND OF THE INVENTION

This invention relates to a separating apparatus and more particularly to a settler type separating apparatus adapted to strip fluid material, for example, oil of fine impure particles.

The prior art filtering apparatus was designed such that when fluid material passed through numerous holes perforated in a filtering medium, impure particles contained in said fluid material were filtered out and collected on one side of the filtering medium. However, such type of filtering apparatus had the drawbacks that extremely fine impure particles could not be eliminated, and such particles would plug up various parts of the system in which the filtering apparatus was used, thereby causing a trouble in the system.

It is accordingly the object of this invention to provide a very efficient separating apparatus of simple construction capable of filtering out even extremely fine impure particles which are measurable only in micrometric units.

SUMMARY OF THE INVENTION

Generally speaking, a separating apparatus according to this invention comprises a liquid holding vessel; a plurality of horizontally disposed particle receiving trays superposed parallel on each other at prescribed intervals, each having a plurality of cavities formed on the upper side; and a screen stretched over the upper open side of said cavities of the tray.

Impure particles contained in the liquid are trapped in the cavities, and the particles collected in said cavities do not escape therefrom because said particles are obstructed by a boundary layer formed by the joint action of the viscosity of the flowing liquid and its friction with the surface of the screen.

The separating apparatus of this invention can eliminate far finer impure particles than the conventional filtering apparatus which filters fluid material directly by a filtering medium, and in consequence prevent the pressure loss which would often occur, as in the prior art apparatus, due to the apertures of the filtering medium being plugged up with impure particles.

The separating apparatus of the invention offers a particularly great advantage where it is used, for example with, a hydraulic system which is repeatedly operated and stopped at a prescribed interval. However, the invention is not limited to such application.

BRIEF DESCRIPTION OF THE DRAWINGS

FIG. 3A relates to A$l$ powders having a particle size of 450 microns, FIG. 3B to $Fe_2O_3$ powders having a particle size of 430 microns, and FIG. 3C to Fe powders 1 and 5 microns in particle size and A$l$ powders similarly 1 and 5 microns in particle size.

DETAILED DESCRIPTION OF THE INVENTION

Figure 1:
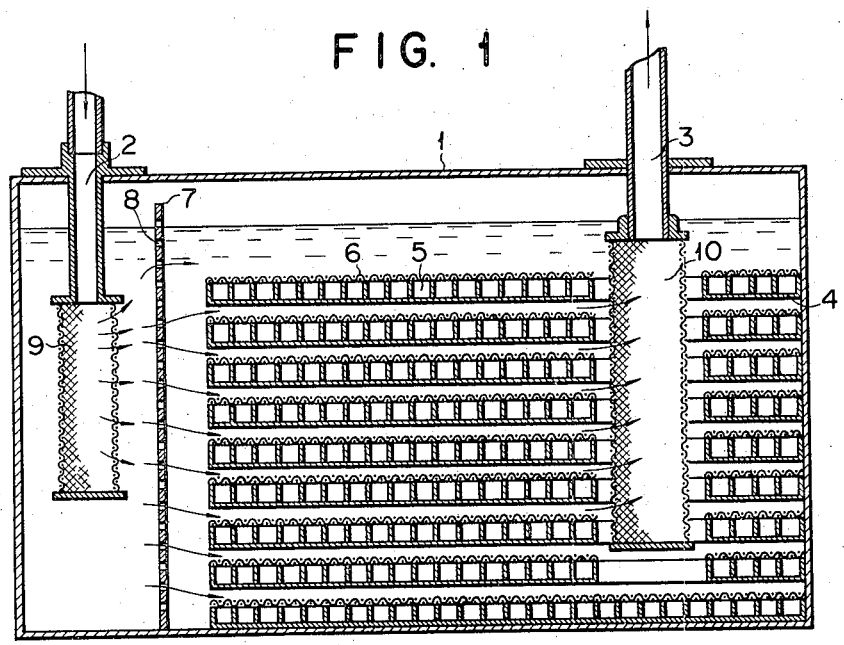
FIG. 1 is a longitudinal sectional view of a filtering apparatus according to an embodiment of this invention.
Figure 2:
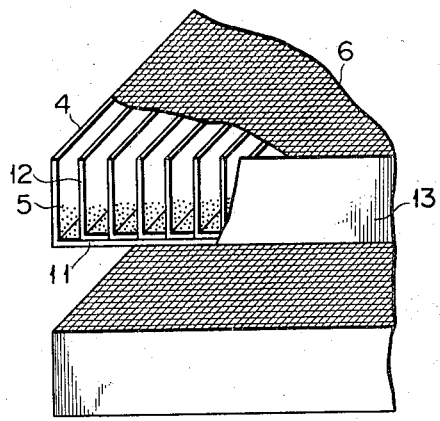
FIG. 2 is an enlarged perspective view, partly in section, of the particle receiving trays used in the filtering apparatus of FIG. 1.

Referring to FIG. 1, numeral 1 represents a liquid holding tank provided with an inlet port 2 and an outlet port 3 spaced from each other towards opposite ends of the tank 1. In the liquid holding tank 1 are received a plurality of horizontally disposed particle receiving trays 4 superposed parallel to each other at prescribed intervals, each having a plurality of cavities 5 formed on the upper side. Impure particles contained in the liquid are collected in the cavities 5 forming narrow grooves extending at right angles to the direction in which the liquid is made to flow. To the upper side of each tray plane fine mesh screen 6 is attached in a plane parallel to the tray to cover the upper open side of the cavities. The screen 6 is prepared from at least a single net of suitable material such as synthetic fiber or metal. The trays 4 may be supported by projections provided on the inner walls of the liquid holding tank 1, or they may be connected with each other in a predetermined relationship before inserted in the tank. In a space within said tank 1 defined by the inlet port 2 and one side of the tray 4 is set up a vertical partition wall 7 perforated with a plurality of apertures 8. The liquid brought into the tank 1 through the inlet port 2 runs in a laminar flow after passing through the apertures 8 of the partition wall 7. The inlet port 2 is provided with a first strainer 9 for initially filtering the liquid, which vertically extends through a space defined between one side wall of the tank 1 and the partition wall 7. The outlet port 3 is provided with a second strainer 10 on that side which faces the opposite side wall of the tank 1. The superposed trays 4 are each bored with a hole at the end facing said second strainer 10, which vertically penetrates a series of said holes. The greater part of the tray 4 is positioned between the first and second strainers 9 and 10.

The tray 4 is built of a horizontal bottom plate 11, a plurality of partition walls 12 bearing an L-shaped cross section and extending at a prescribed space perpendicularly to the direction in which the liquid flows and side boards 13 fitted to the opposite edges of said partition walls 12. The cavities of the tray 14 are defined by said bottom plate 11, partition walls 12 and side boards 13. The tray may be molded from plastics material.

The interval at which one particle receiving tray is vertically spaced from another, the width of the cavities of the tray, the depth of each cavity and the mesh size of a screen stretched over the filtering tray should preferably be so determined as to most effectively attain the removal of impure particles from the liquid to the cavity and prevent the escape of impure particles from the cavity. All the above-mentioned factors may be suitably chosen in consideration of the settling speed of impure particles in the liquid defined by, for example, the viscosity and density of the liquid, the size of impure particles and their density, as well as of the flowing speed of the liquid during the operating and nonoperating periods of a system with which the subject filtering apparatus is used.

The settling speed V of impure particles may generally be determined from the following Stokes equation:

$$V = 1/18 \cdot (P_0 - P)g/n \cdot d^2$$

where:

$P_0$ = density of impure particle

P = density of liquid
g = gravitational acceleration
d = diameter of impure particles
n = viscosity of liquid It was experimentally found that the sufficient vertical interval between the superposed particle receiving trays 4 would be 2 cm in order to cause the impure particles of, for example, $Fe_2O_3$ to settle in the cavities 5 of the filtering trays 4 under the following conditions:

| | |
|---|---|
| Period in which the subject filtering apparatus stands at rest | = 12 hr |
| Viscosity of liquid | = 20 cst |
| Temperature of liquid | = normal |
| Diameter of impure particles | = 1 micron and over |

Figure 3A:
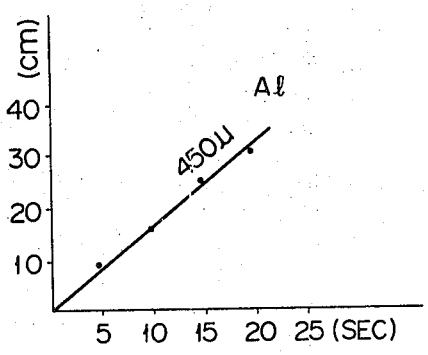
FIGS. 3A, 3B and 3C are graphs showing the relationship of a lapse of time after impure particles commence settling and a distance covered thereby during said time.
Figure 3B:
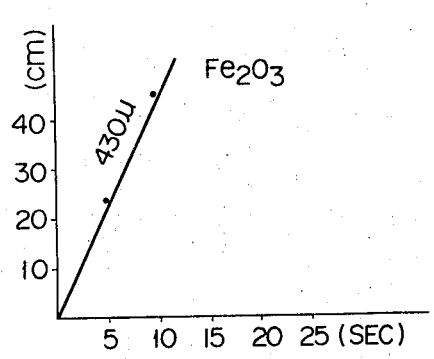
Figure 3C:
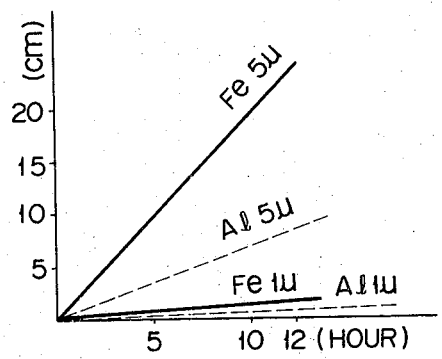

The experiment further showed that impure particles actually settled more quickly than at the settling speed V determined from the above equation. The reason was believed to be that impure particles of different shapes and sizes agglomerated in the course of settling, thereby increasing their settling speed. FIGS. 3A, 3B and 3C present the results of experiments conducted to determine the relationship of a lapse of time after particles of various impurities commenced settling and a distance covered thereby during said time. The experiments were carried out under the same conditions as described above.

There will now be described the operation of a filtering apparatus according to this invention where it is applied to an intermittently actuated system.

While the system is worked, a liquid entering the liquid tank 1 is conducted through the first strainer 9 to one side of the tank 1. Then the liquid passes through the holes 8 of the partition wall 7 and further travels in a laminar flow through the interspace between the filtering trays 4 on to the opposite side of the tank 1. The liquid is carried through the second strainer 10 and drawn outside of the tank 1 through the outlet port 3. The liquid thus discharged circulates through the system and is again brought into the tank 1. During this time, the larger impure particles contained in the liquid are filtered off by the first and second strainers 9 and 10 and partly settle to be collected in the cavities 5 through the screens 6.

Where the system stops and the liquid in the tank 1 is brought to rest, most of the impure particles contained in the liquid begin to settle and are trapped in the cavities 5 through the screens. Unlike the prior art directly filtering apparatus, the settler type filtering apparatus of this invention enables extremely fine impure particles to be collected in the cavities 5.

Where the system is again brought into operation and the liquid begins to flow, there is formed over the open side of the cavities a boundary layer of liquid due to the joint action of the viscosity of the liquid and its friction with the surface of the screens 6. Accordingly, the impure particles accumulated in the cavities 5 are prevented by said boundary layer from moving outside of the tray even while the liquid continues to flow, and these impure particles are retained in the tray.

In the foregoing embodiment, the cavities 5 are formed by the partition walls 12 into elongate parallel grooves extending at right angles to the direction in which the liquid flows. However, it is possible to arrange these cavities 5 in a matrix form using partition walls which 12 perpendicularly intersect each other. Further, the screen 6 may be prepared from other suitable materials than the material previously described.

What is claimed is:

1. A settler type separating apparatus comprising a vessel for holding liquid having an inlet and outlet spaced from each other towards opposite ends of said vessel; a plurality of longitudinal particle-receiving trays horizontally disposed in the vessel between at least said inlet and outlet and superposed in parallel and vertically spaced relationship with each other at prescribed vertical intervals, each of said trays having upwardly opening cavities; a fine mesh screen mounted over each tray to cover the upper opening of the cavities; and partition means disposed between said inlet and one side of said trays constructed and arranged so as to cause liquid introduced through said inlet to run over said screens in laminar flow and the screens are constructed and arranged, so that the flow of the liquid over the screens forms a boundry layer, said screens permitting particles in the liquid to settle from the liquid into the cavities, but the escape of said particles from the cavities being obstructed by the boundary layer.

2. The separating apparatus according to claim 1 wherein the cavities constitute narrow grooves extending at right angles to the liquid flowing direction from the inlet to the outlet.

3. The separating apparatus according to claim 2 wherein the particle-receiving trays are each built of a bottom plate, a plurality of partition walls set up on the bottom plate at right angles to the flow direction of the liquid and side boards fitted to the opposite edges of the partition walls and the aforesaid grooves are defined by said bottom plate, partition walls and side boards.

4. The separating apparatus according to claim 3 wherein said partition means comprises a vertical perforated wall.

5. The separating apparatus according to claim 4 wherein the inlet and outlet are each provided with a strainer.

* * * * *